US011740178B2

(12) United States Patent
Ohyama et al.

(10) Patent No.: US 11,740,178 B2
(45) Date of Patent: Aug. 29, 2023

(54) AEROSOL MEASUREMENT APPARATUS AND AEROSOL MEASUREMENT METHOD

(71) Applicant: Panasonic Intellectual Property Management Co., Ltd., Osaka (JP)

(72) Inventors: Tatsushi Ohyama, Osaka (JP); Mariko Miyashita, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 330 days.

(21) Appl. No.: 17/231,046

(22) Filed: Apr. 15, 2021

(65) Prior Publication Data

US 2021/0255099 A1 Aug. 19, 2021

Related U.S. Application Data

(63) Continuation of application No. PCT/JP2020/007019, filed on Feb. 21, 2020.

(30) Foreign Application Priority Data

Mar. 29, 2019 (JP) .................................. 2019-065423

(51) Int. Cl.
*G01N 21/49* (2006.01)
*G01S 17/95* (2006.01)
*G01N 21/53* (2006.01)

(52) U.S. Cl.
CPC ............. *G01N 21/49* (2013.01); *G01N 21/53* (2013.01); *G01S 17/95* (2013.01)

(58) Field of Classification Search
CPC ........ G01N 21/49; G01N 21/53; G01S 17/95; Y02A 90/10
See application file for complete search history.

(56) References Cited

U.S. PATENT DOCUMENTS

2004/0239913 A1* 12/2004 Kobayashi .............. G01W 1/00
356/4.01
2006/0262324 A1* 11/2006 Hays ....................... G01P 5/26
356/519

(Continued)

FOREIGN PATENT DOCUMENTS

WO 2003/073127 9/2003
WO 2016/208013 12/2016

OTHER PUBLICATIONS

International Search Report of PCT application No. PCT/JP2020/007019 dated Apr. 14, 2020.

*Primary Examiner* — Dominic J Bologna
(74) *Attorney, Agent, or Firm* — McDermott Will & Emery LLP

(57) ABSTRACT

An aerosol measurement apparatus for measuring an aerosol contained in a scatterer present in an atmosphere includes a light source, an optical element (i) that irradiates the scatterer with interfering light produced by causing emitted light emitted from the light source to interfere in an interior of the optical element, the interfering light having a plurality of peaks spaced at frequency intervals equal to one another, and (ii) that emits Mie scattered light by causing scattered light generated in the scatterer to interfere in the interior, and a photodetector that receives the Mie scattered light and outputs a signal corresponding to an intensity of light received.

21 Claims, 12 Drawing Sheets

(56) References Cited

U.S. PATENT DOCUMENTS

| | | | | |
|---|---|---|---|---|
| 2011/0164783 A1* | 7/2011 | Hays | ............... | G01S 17/003 356/519 |
| 2012/0002212 A1* | 1/2012 | Chandler | ............ | G01J 3/457 356/454 |
| 2017/0212219 A1* | 7/2017 | Spuler | ............. | G01N 21/538 |

* cited by examiner

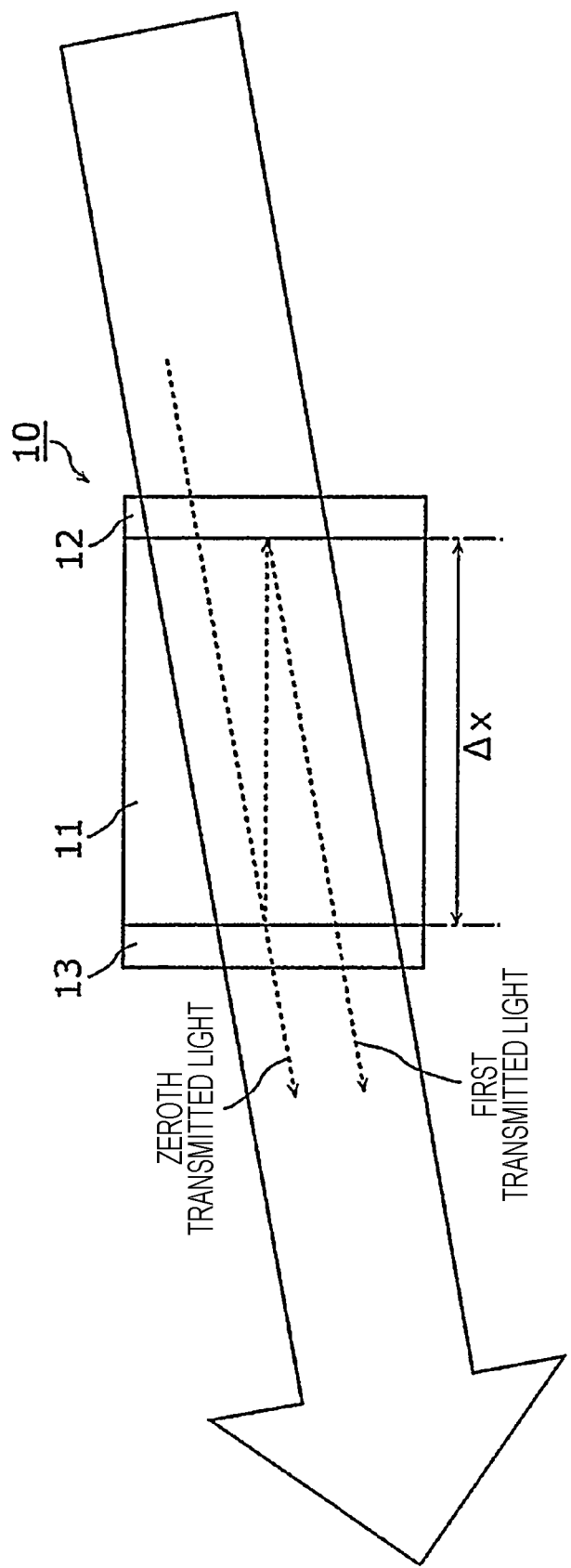

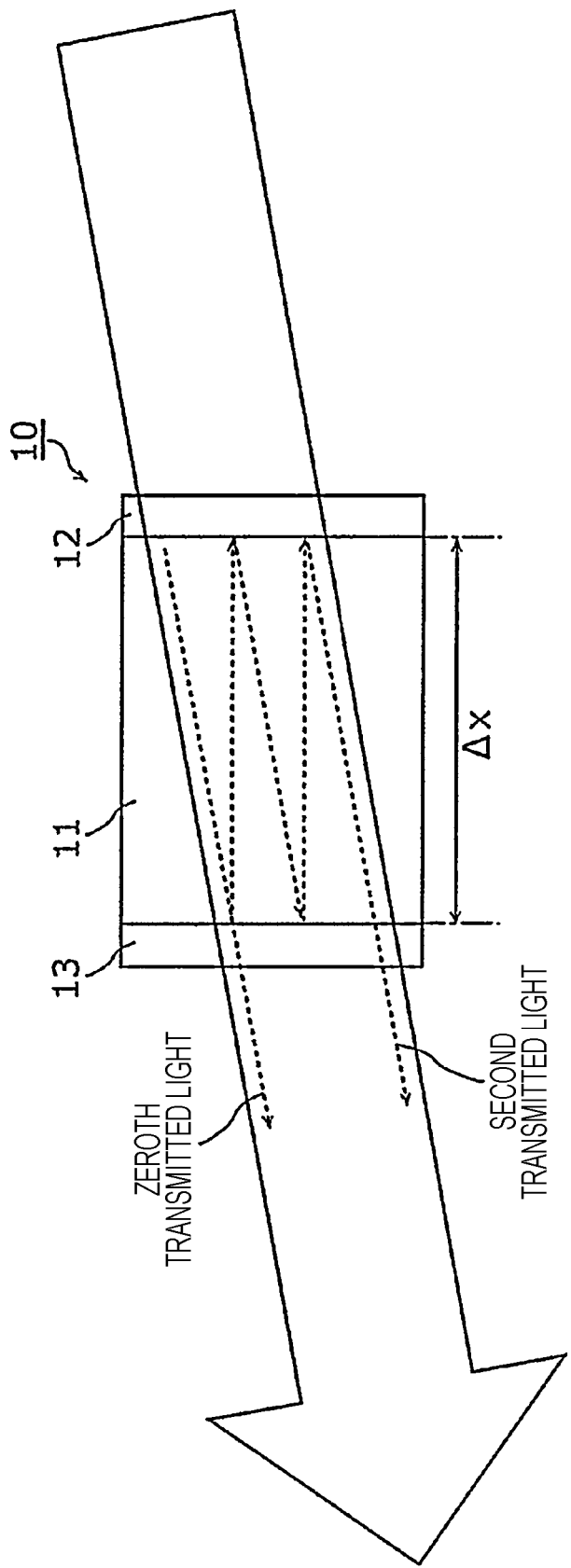

AEROSOL MEASUREMENT APPARATUS AND AEROSOL MEASUREMENT METHOD

BACKGROUND

1. Technical Field

The present disclosure relates to an aerosol measurement apparatus and an aerosol measurement method.

2. Description of the Related Art

Conventionally, there has been known a technology with which to measure an aerosol in the atmosphere through the use of LIDAR (Light Detection and Ranging). LIDAR is a technology with which to measure and analyze scattered light produced by scattering pulsed light emitted into the atmosphere and thereby observe an aerosol of, for example, yellow sand, pollen, dust, or microdroplets of water suspended in air.

The scattered light usually includes Mie scattered light and Rayleigh scattered light. The Mie scattered light is scattered light generated by Mie scattering, which is a scattering phenomenon that occurs due to fine particles whose particle diameter is greater than or equal to the wavelength of the emitted light. The Mie scattered light is for example scattered light from the aerosol, which is a measurement object. Rayleigh scattering is a scattering phenomenon that occurs due to fine particles and atmospheric molecules that are smaller than the wavelength of the emitted light. Excluding the Rayleigh scattered light from the scattered light gives the Mie scattered light.

For example, International Publication No. 2003/073127 discloses a technology with which to spectrally separate scattered light based on single laser light into Mie scattered light and Rayleigh scattered light through the use of a filter. Further, for example, Japanese Patent No. 6243088 discloses a technology, based on the fact that a spectrum of laser light of a multiple longitudinal mode has regular mode spacings, with which to disperse scattered light through the use of an interferometer that selectively transmits light of the same spectral intervals as laser light emitted.

SUMMARY

In one general aspect, the techniques disclosed here feature an aerosol measurement apparatus for measuring an aerosol contained in a scatterer present in an atmosphere, the aerosol measurement apparatus including: a light source; an optical element (i) that irradiates the scatterer with interfering light produced by causing emitted light emitted from the light source to interfere in an interior of the optical element, the interfering light having a plurality of peaks spaced at frequency intervals equal to one another, and (ii) that emits Mie scattered light by causing scattered light generated in the scatterer to interfere in the interior; and a photodetector that receives the Mie scattered light and outputs a signal corresponding to an intensity of light received.

Further, in another general aspect, the techniques disclosed here feature an aerosol measurement apparatus for measuring an aerosol contained in a scatterer present in an atmosphere, the aerosol measurement apparatus including: a light source; a first optical element that irradiates the scatterer with interfering light produced by causing emitted light emitted from the light source to interfere in an interior of the first optical element, the interfering light having a plurality of peaks spaced at frequency intervals equal to one another; a second optical element that emits Mie scattered light by causing scattered light generated in the scatterer to interfere in an interior of the second optical element; and a photodetector that receives the Mie scattered light and outputs a signal corresponding to an intensity of light received.

Further, in one general aspect, the techniques disclosed here feature an aerosol measurement method for measuring an aerosol contained in a scatterer present in an atmosphere, the aerosol measurement method including: irradiating the scatterer with interfering light produced by causing light incident from a light source to interfere in an interior of an optical element, the interfering light having a plurality of peaks spaced at frequency intervals equal to one another; causing Mie scattered light to be emitted from the optical element by causing scattered light generated in the scatterer to interfere in the interior of the optical element; and receiving the Mie scattered light and outputting a signal corresponding to an intensity of light received.

Further, in another general aspect, the techniques disclosed here feature an aerosol measurement method for measuring an aerosol contained in a scatterer present in an atmosphere, the aerosol measurement method including: irradiating the scatterer with interfering light produced by causing light incident from a light source to interfere in an interior of a first optical element, the interfering light having a plurality of peaks spaced at frequency intervals equal to one another; causing Mie scattered light to be emitted from a second optical element by causing scattered light generated in the scatterer to interfere in an interior of the second optical element; and receiving the Mie scattered light and outputting a signal corresponding to an intensity of light received.

Further, an aspect of the present disclosure may be implemented as a program for causing a computer to execute the aerosol measurement method. Alternatively, the present disclosure may be implemented as a non-transitory computer-readable recording medium storing the program.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram for explaining a zeroth transmitted light and a first transmitted light that pass through an optical element of the aerosol measurement apparatus according to Embodiment 1;

FIG. 5 is a diagram for explaining the zeroth transmitted light and a second transmitted light that pass through an optical element of the aerosol measurement apparatus according to Embodiment 1;

DETAILED DESCRIPTION

Figure 1:
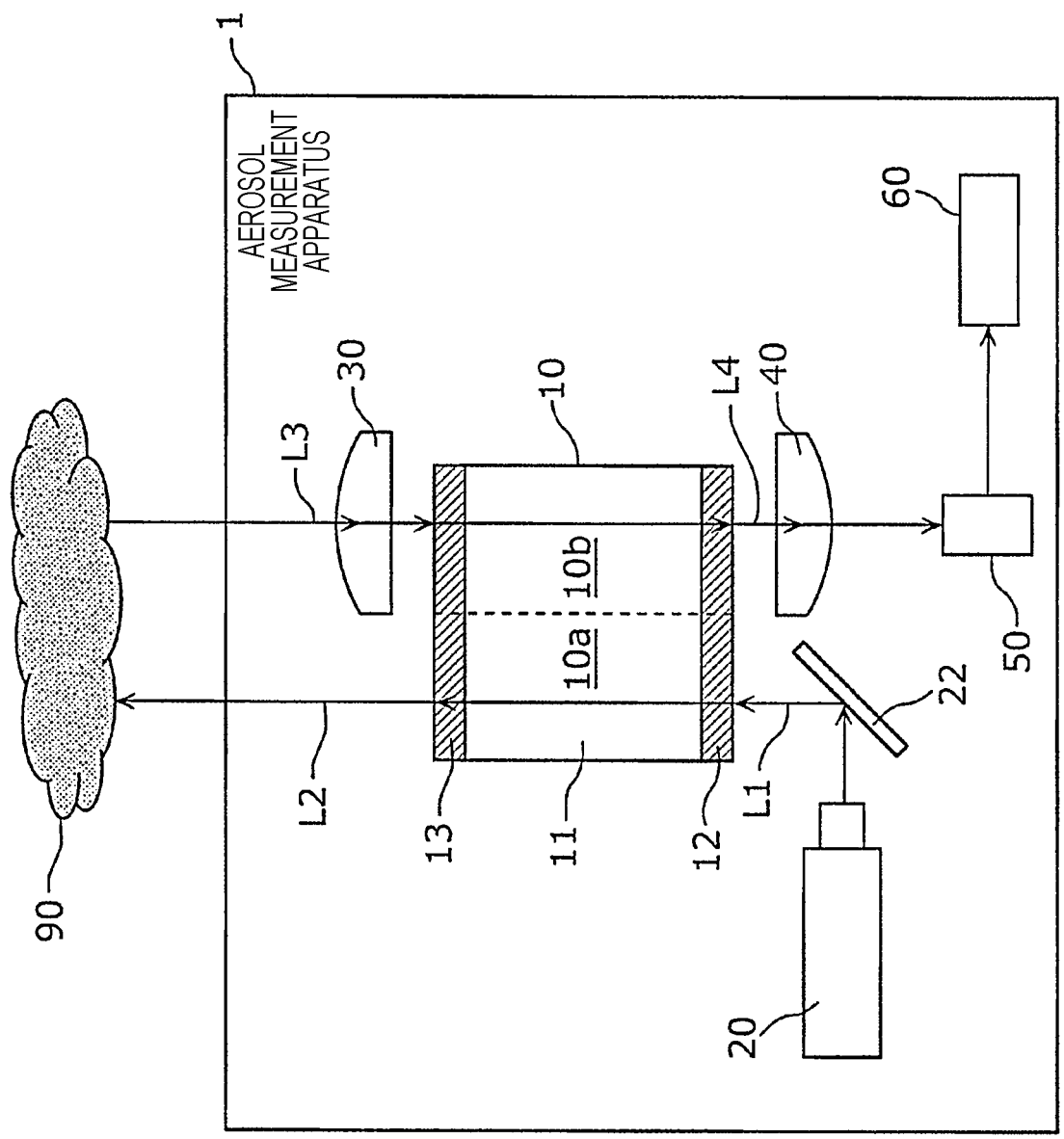
FIG. 1 is a diagram showing a configuration of an aerosol measurement apparatus according to Embodiment 1.

The conventional technology make it necessary to, in case of a change in peak wavelength of laser light due to a temperature change or other reasons, effect tuning while sweeping an optical path difference by one wavelength of laser light. For this reason, the conventional technologies require a structure that renders an optical path difference variable, making an apparatus larger in size and making a measuring method more complex.

One non-limiting and exemplary embodiment provides a small-sized aerosol measurement apparatus that makes it possible to easily measure an aerosol and an aerosol measurement method that makes it possible to easily measure an aerosol.

Brief Overview of the Present Disclosure

In one general aspect, the techniques disclosed here feature an aerosol measurement apparatus for measuring an aerosol contained in a scatterer present in an atmosphere, the aerosol measurement apparatus including: a light source; an optical element (i) that irradiates the scatterer with interfering light produced by causing emitted light emitted from the light source to interfere in an interior of the optical element, the interfering light having a plurality of peaks spaced at frequency intervals equal to one another, and (ii) that emits Mie scattered light by causing scattered light generated in the scatterer to interfere in the interior; and a photodetector that receives the Mie scattered light and outputs a signal corresponding to an intensity of light received.

This eliminates the need for a configuration in which an optical path length is rendered variable, thus making it possible to inhibit upsizing of the aerosol measurement apparatus. Further, since the optical element makes it possible to eliminate Rayleigh scattered light, this makes it possible to, without the need for complex signal processing, easily measure an aerosol on the basis of the intensity of light received by the photodetector. In this way, the present aspect makes it possible to achieve a small-sized aerosol measurement apparatus that makes it possible to easily measure an aerosol.

Further, for example, in the aerosol measurement apparatus according to the aspect of the present disclosure, the optical element may be an etalon.

Since the optical element is an etalon, this makes it possible to inhibit upsizing of the aerosol measurement apparatus.

Further, for example, in the aerosol measurement apparatus according to the aspect of the present disclosure, the frequency intervals may be less than or equal to 3.9 GHz.

Since the optical element can inhibit transmission of Rayleigh scattered light, this allows the photodetector to receive Mie scattered light based on an aerosol. Accordingly, this makes it possible to easily measure the presence or absence of and the concentration of an aerosol on the basis of the intensity of light received by the photodetector.

Further, for example, in the aerosol measurement apparatus according to the aspect of the present disclosure, the optical element may be a single optical element, the light source may emit, via the single optical element, the light having a plurality of peaks, and the photodetector may receive the Mie scattered light having passed through the single optical element.

For example, an optical element such as an etalon changes its optical properties in a case where it has expanded under the influence of heat. The present aspect makes it possible to, even if the optical properties of the optical element change, sufficiently curb the influence of a change in the properties of the optical element, as the emitted light and the scattered light passes through the same single optical element. This makes it possible to increase the precision of measurement of an aerosol.

Further, for example, in the aerosol measurement apparatus according to the aspect of the present disclosure, the optical element may have a first portion including a path through which the emitted light passes and a second portion including a path through which the scattered light passes and differing from the first portion.

This makes it possible to easily separate the path of the emitted light and the path of the scattered light from each other, thus making it possible, for example, to place the photodetector and the light source at a distance from each other. Placing the photodetector and the light source at a distance from each other makes it possible to inhibit reflected light produced by the optical element reflecting the emitted light emitted from the light source from being received by the photodetector. The reflected light becomes a factor for false detection of an aerosol. Further, the reflected light, which is higher in intensity than scattered light, may also become a factor for a failure in the photodetector by exceeding a critical strength that the photodetector can detect. For this reason, the present aspect, which makes it possible to inhibit the reflected light from being received by the photodetector, makes it possible to inhibit, for example, false detection of an aerosol and a failure in the photodetector.

Further, for example, in the aerosol measurement apparatus according to the aspect of the present disclosure, the optical element may have a first surface and a second surface opposite to the first surface, and the emitted light and the scattered light may enter the optical element through the first surface.

This allows the emitted light and the scattered light to enter the optical element through the same surface, thus making it possible to make it hard for a portion of the emitted light emitted from the light source that was reflected off the optical element to fall on the photodetector. This makes it possible to inhibit, for example, false detection of an aerosol and a failure in the photodetector due to such reflected light.

Further, for example, in the aerosol measurement apparatus according to the aspect of the present disclosure, the optical element may have a first surface and a second surface opposite to the first surface, the emitted light may enter the optical element through the first surface, and the scattered light may enter the optical element through the second surface.

This makes it possible to reduce the number of times a path of light is bent within the aerosol measurement apparatus. This makes it possible to reduce the number of components such as mirrors and reduce space for placement of such components, making it possible to achieve a lightweight small-sized aerosol measurement apparatus.

Further, for example, in the aerosol measurement apparatus according to the aspect of the present disclosure, the emitted light may be pulsed light, and the photodetector may receive the Mie scattered light after having blocked reception of light until a period of time that is longer than a duration of time of the pulsed light has elapsed since the pulsed light was emitted.

This makes it possible to inhibit, for example, false detection of an aerosol due to reflected light and a failure in the photodetector due to saturation.

Further, for example, in the aerosol measurement apparatus according to the aspect of the present disclosure, the scattered light may enter the optical element obliquely.

This makes it possible to effect a change in optical path length by adjusting an angle of incidence.

Further, for example, in the aerosol measurement apparatus according to the aspect of the present disclosure, the light source may be a laser element or a light-emitting diode (LED).

This makes it possible to emit the emitted light toward the scatterer with sufficient intensity even in case of attenuation of intensity by the optical element.

Further, for example, the aerosol measurement apparatus according to the aspect of the present disclosure may further include a condenser that concentrates the scattered light, and the condenser may concentrate the scattered light before the scattered light interferes in the interior of the optical element.

This makes it possible to increase interference efficiency within the optical element. Further, this also makes it possible to increase photosensitivity to light, thus making it possible to increase the precision of measurement of aerosol particles.

Further, for example, the aerosol measurement apparatus according to the aspect of the present disclosure may further include a signal processing circuit that processes the signal.

Further, in another general aspect, the techniques disclosed here feature an aerosol measurement apparatus for measuring an aerosol contained in a scatterer present in an atmosphere, the aerosol measurement apparatus including: a light source; a first optical element that irradiates the scatterer with interfering light produced by causing emitted light emitted from the light source to interfere in an interior of the first optical element, the interfering light having a plurality of peaks spaced at frequency intervals equal to one another; a second optical element that emits Mie scattered light by causing scattered light generated in the scatterer to interfere in an interior of the second optical element; and a photodetector that receives the Mie scattered light and outputs a signal corresponding to an intensity of light received.

This makes it possible to easily separate the path of the emitted light and the path of the scattered light from each other, thus making it possible, for example, to place the photodetector and the light source at a distance from each other. This makes it possible to inhibit the emitted light emitted from the light source to be received by the photodetector, thus making it possible to inhibit, for example, false detection of an aerosol and a failure in the photodetector. Further, this makes it possible to increase the degree of freedom in the design of placement of elements of the aerosol measurement apparatus and paths of light.

Further, for example, in the aerosol measurement apparatus according to the aspect of the present disclosure, the first optical element and the second optical element may be etalons.

Since the first optical element and the second optical element are etalons, this makes it possible to inhibit upsizing of the aerosol measurement apparatus.

Further, for example, in the aerosol measurement apparatus according to the aspect of the present disclosure, the frequency intervals may be less than or equal to 3.9 GHz.

Since the second optical element can inhibit transmission of Rayleigh scattered light, this allows the photodetector to receive Mie scattered light based on an aerosol. Accordingly, this makes it possible to easily measure the presence or absence of and the concentration of an aerosol on the basis of the intensity of light received by the photodetector.

Further, for example, in the aerosol measurement apparatus according to the aspect of the present disclosure, the emitted light may be pulsed light, and the photodetector may receive the Mie scattered light after having blocked reception of light until a period of time that is longer than a duration of time of the pulsed light has elapsed since the pulsed light was emitted.

This makes it possible to inhibit, for example, false detection of an aerosol due to reflected light and a failure in the photodetector due to saturation.

Further, for example, in the aerosol measurement apparatus according to the aspect of the present disclosure, the scattered light may enter the second optical element obliquely.

This makes it possible to effect a change in optical path length by adjusting an angle of incidence.

Further, for example, in the aerosol measurement apparatus according to the aspect of the present disclosure, the light source may be a laser element or a light-emitting diode.

This makes it possible to emit the emitted light toward the scatterer with sufficient intensity even in case of attenuation of intensity by the first optical element.

Further, for example, the aerosol measurement apparatus according to the aspect of the present disclosure may further include a condenser that concentrates the scattered light, and the condenser may concentrate the scattered light before the scattered light interferes in the interior of the second optical element.

This makes it possible to increase interference efficiency within the second optical element. Further, this also makes it possible to increase photosensitivity to light, thus making it possible to increase the precision of measurement of aerosol particles.

Further, for example, the aerosol measurement apparatus according to the aspect of the present disclosure may further include a signal processing circuit that processes the signal.

Further, in one general aspect, the techniques disclosed here feature an aerosol measurement method for measuring an aerosol contained in a scatterer present in an atmosphere, the aerosol measurement method including: irradiating the scatterer with interfering light produced by causing light incident from a light source to interfere in an interior of an optical element, the interfering light having a plurality of peaks spaced at frequency intervals equal to one another; causing Mie scattered light to be emitted from the optical element by causing scattered light generated in the scatterer to interfere in the interior of the optical element; and receiving the Mie scattered light and outputting a signal corresponding to an intensity of light received.

Further, in another general aspect, the techniques disclosed here feature an aerosol measurement method for measuring an aerosol contained in a scatterer present in an atmosphere, the aerosol measurement method including: irradiating the scatterer with interfering light, produced by causing light incident from a light source to interfere in an interior of a first optical element, the interfering light having a plurality of peaks spaced at frequency intervals equal to one another; causing Mie scattered light to be emitted from a second optical element by causing scattered light generated in the scatterer to interfere in an interior of the second optical element; and receiving the Mie scattered light and outputting a signal corresponding to an intensity of light received.

Since the optical element or the second optical element make it possible to eliminate Rayleigh scattered light, this makes it possible to, without the need for complex signal processing, easily measure an aerosol on the basis of the intensity of light received by the photodetector.

In the present disclosure, all or some of the circuits, units, devices, members, or sections or all or some of the functional blocks in the block diagrams may be implemented as one or more of electronic circuits including, but not limited to, a semiconductor device, a semiconductor integrated circuit (IC), or an LSI (large scale integration). The LSI or IC can be integrated into one chip, or also can be a combination of multiple chips. For example, functional blocks other than a memory may be integrated into one chip. The name used here is LSI or IC, but it may also be called system LSI, VLSI (very large scale integration), or ULSI (ultra large scale integration) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or some of the functions or operations of the circuits, units, devices, members, or sections are implemented by executing software. In such a case, the software is recorded on one or more non-transitory recording media such as a ROM, an optical disk, or a hard disk drive, and when the software is executed by a processor, the software causes the processor together with peripheral devices to execute the functions specified in the software. A system or device may include such one or more non-transitory recording media on which the software is recorded and a processor together with necessary hardware devices such as an interface.

In the following, embodiments are specifically described with reference to the drawings.

It should be noted that the embodiments to be described below each illustrate a comprehensive and specific example of the present disclosure. The numerical values, shapes, materials, constituent elements, placement and topology of constituent elements, steps, orders of steps, and the like that are shown in the following embodiments are merely examples and are not intended to limit the present disclosure. Further, those of the constituent elements in the following embodiments which are not recited in an independent claim are described as optional constituent elements.

Further, the drawings are schematic views and are not necessarily strict illustrations. Accordingly, for example, the drawings are not necessarily to scale. Further, in the drawings, substantially the same components are given the same reference signs, and a repeated description may be omitted or simplified.

Further, terms such as "parallel" used herein to show the way in which elements are interrelated, terms such as "columnar" or "prismatic" used herein to show the shape of an element, and ranges of numerical values used herein are not expressions that represent only exact meanings but expressions that are meant to also encompass substantially equivalent ranges, e.g. differences of approximately several percent.

Embodiment 1

1. Configuration

First, a brief overview of an aerosol measurement apparatus according to Embodiment 1 is given with reference to FIG. 1. FIG. 1 is a diagram showing a configuration of an aerosol measurement apparatus 1 according to the present embodiment.

As shown in FIG. 1, the aerosol measurement apparatus 1 according to the present embodiment emits emitted light L2 into the atmosphere, acquires scattered light L3 generated by scattering of the emitted light L2 by a scatterer 90 present in the atmosphere, processes the scattered light L3 thus acquired, and thereby measures the presence or absence of and the concentration of an aerosol contained in the scatterer 90. The scatterer 90 is present in a target space to be measured by the aerosol measurement apparatus 1.

The target space is a room in a building such as a house, an office, a nursing facility, or a hospital. The target space is, but is not limited to, an enclosed space partitioned by, for example, a wall, a window, a door, a floor, and a ceiling. The target space may be an outdoor open space. Alternatively, the target space may be an interior space in a movable body such as a bus or an airplane.

The scatterer 90 contains the aerosol, which is a measurement object. The aerosol is specifically grit and dust, suspended particulate matter such as PM 2.5, bioparticles, or microdroplets of water suspended in the target space. The bioparticles include mold, ticks, or pollen suspended in air. Further, the microdroplets of water include matter dynamically generated from humans coughing or sneezing.

The aerosol, which is a measurement object, is sufficiently larger than the molecules that make up air. In the present embodiment, the aerosol has a particle diameter that is greater than or equal to the wavelength of the emitted light L2 and therefore generates Mie scattered light by scattering the emitted light L2. The molecules that make up air are sufficiently smaller than the wavelength of the emitted light L2 and therefore generate Rayleigh scattered light by scattering the emitted light L2. Accordingly, the scattered light L3 that is acquired by the aerosol measurement apparatus 1 includes the Mie scattered light and the Rayleigh scattered light. The Mie scattered light here is backscattered light produced by Mie scattering. The aerosol measurement apparatus 1 according to the present embodiment extracts the Mie scattered light from the scattered light L3 and measures the presence or absence of and/or the concentration of the aerosol on the basis of the Mie scattered light thus extracted.

The aerosol measurement apparatus 1 according to the present embodiment emits the emitted light L2 toward different positions in the target space. The direction of emission of the emitted light L2 can be changed by, for example, a MEMS (microelectromechanical system) mirror (not illustrated). Alternatively, the direction of emission of the emitted light L2 may be changed by changing the overall orientation of the aerosol measurement apparatus 1. The aerosol measurement apparatus 1 can create a distribution of the aerosol in the target space by scanning in the target space.

As shown in FIG. 1, the aerosol measurement apparatus 1 includes an optical element 10, a light source 20, a mirror 22, a condensing lens 30, which is an example of a condenser, a condensing lens 40, a photodetector 50, and an analyzer 60, which is an example of a signal processing circuit. In the following, the constituent elements of the aerosol measurement apparatus 1 are described.

The optical element 10 causes incident light to interfere in the interior thereof and emits it as interfering light that is light having a plurality of peaks at equal frequency intervals. The light having a plurality of peaks is also called "multiple light". In the present embodiment, the optical element 10 is a single optical element. That is, the optical element 10 is one inseparable member. The optical element 10 is for example columnar or prismatic in shape. The optical element 10 is specifically an etalon.

As shown in FIG. 1, the optical element 10 has a translucent section 11 and two multilayer films 12 and 13. The translucent section 11 is made of a transparent material such as quartz or crystal. The translucent section 11 is sandwiched between the two multilayer films 12 and 13, and is in contact with each of the two multilayer films 12 and 13. The two multilayer films 12 and 13 are each a dielectric multilayer film having a structure in which a plurality of dielectric films are stacked on top of each other. For example, the two multilayer films 12 and 13 are each formed by alternately stacking a low-refractive-index dielectric film and a high-refractive-index dielectric film on top of each other. Examples of the dielectric films include titanium oxide films, hafnium oxide films, and silicon oxide films. The translucent section 11 may be an air layer, and the two multilayer films 12 and 13 may be fixed by, for example, a frame body so as to keep a constant distance from each other.

The optical element 10 receives emitted light L1 emitted from the light source 20, causes the emitted light L1 to interfere in the interior thereof, and thereby emits emitted light L2, which is light having a plurality of peaks at equal frequency intervals. The emitted light L2 is multiple laser light. In the present embodiment, the emitted light L1 enters the optical element 10 through the multilayer film 12 and exits the optical element 10 through the multilayer film 13. A surface of the multilayer film 12 on which the emitted light L1 falls is an example of a first surface of the optical element 10. A surface of the multilayer film 13 on which the emitted light L2 falls is an example of a second surface of the optical element 10, and is a surface opposite to the first surface.

Further, the optical element 10 receives scattered light L3 concentrated by the condensing lens 30. In the present embodiment, the scattered light L3 enters the optical element 10 through the multilayer film 13. That is, the surface on which the emitted light L1 falls and the surface on which the scattered light L3 falls are different from each other.

As shown in FIG. 1, the optical element 10 has a first portion 10a including a path through which the emitted light L1 passes and a second portion 10b including a path through which the scattered light L3 passes. FIG. 1 uses a dashed line to schematically represent a boundary between the first portion 10a and the second portion 10b. The first portion 10a and the second portion 10b are portions that are different from each other. For example, in a case where the optical element 10 is a columnar etalon, the first portion 10a and the second portion 10b correspond to semicolumnar portions into which the etalon is virtually divided along a plane including the central axis. Circular top and bottom surfaces of the columnar etalon correspond to surfaces through which light enters and exits. The path of the emitted light L1 and the path of the scattered light L3 are for example parallel to each other.

Since the scattered light L3 includes light having a plurality of peaks at equal frequency intervals, the lights interfere with one another in passing through the optical element 10. In the present embodiment, the optical element 10 has its thickness adjusted so that passage of Mie scattered light L4 included in the scattered light L3 is allowed and passage of Rayleigh scattered light is inhibited. This makes it possible to appropriately eliminate the Rayleigh scattered light from the scattered light L3, thus allowing the photodetector 50 to receive the Mie scattered light L4, which is attributed to the aerosol.

In the present embodiment, the optical element 10 is located on an optical path of the emitted light L1 emitted from the light source 20. Specifically, the optical element 10 is located between the mirror 22 and an opening provided in an outer-shell housing of the aerosol measurement apparatus 1. The opening is provided so that the emitted light L2 emitted from the optical element 10 passes through the opening. Furthermore, the optical element 10 is located on an optical path of the scattered light L3 generated from the scatterer 90. Specifically, the optical element 10 is located between the condensing lens 30 and the condensing lens 40.

The light source 20 emits the emitted light L2 into the atmosphere via the optical element 10. Specifically, the light source 20 emits the emitted light L1. The emitted light L1 is for example pulsed light, or may be continuous light. The emitted light L1 may be single-color light having a peak in a particular band of wavelengths, or may be light including a broad band of wavelengths. The bandwidth of the peak falls within a range of, for example, 10 pm to 10 nm. An example of the emitted light L1 is ultraviolet light, blue light, or infrared light. By interfering in the interior of the optical element 10 after having been reflected off the mirror 22, the emitted light L1 is emitted into the atmosphere as the emitted light L2, which is light having a plurality of peaks at equal frequency intervals.

The light source 20 is for example a semiconductor laser element that emits pulsed laser light as the emitted light L1. A beam mode of the emitted light L1 is for example a multiple mode, or may be a single mode. As one example, the light source 20 emits, as the emitted light L1, laser light having a peak near 405 nm. Alternatively, the light source 20 may be a light-emitting diode (LED). Alternatively, the light source 20 may be a discharge lamp such as a halogen lamp.

The mirror 22 reflects the emitted light L1. Placing the mirror 22 at an appropriate angle with respect to the emitted light L1 makes it possible to bend the emitted light L1 so that the emitted light L1 travels in a desired direction. In the present embodiment, the mirror 22 reflects the emitted light L1 so that the emitted light L1 enters the optical element 10. It should be noted that the aerosol measurement apparatus 1 does not need to include the mirror 22.

The condenser serves to concentrate the scattered light L3 generated by scattering of the emitted light L2 by the scatterer 90 contained in the atmosphere. An example of the condenser is a convex condensing lens 30 or at least one reflecting mirror. For example, light concentrated by the condensing lens 30 is converted by a lens group including a collimating lens into parallel light that is emitted. Therefore, the scattered light L3 concentrated by the condensing lens 30 enters the optical element 10. In a case where the signal strength of the scattered light L3 is high, the condenser does not particularly need to be provided.

The scattered light L3 concentrated by the condensing lens 30 enters the optical element 10.

The condensing lens 40 concentrates the Mie scattered light L4, included in the scattered light L3 concentrated by the condensing lens 30, that has passed through the optical element 10. The condensing lens 40 is for example a convex lens. The condensing lens 40 concentrates the Mie scattered light L4 onto a photosensitive surface of the photodetector 50.

The photodetector 50 receives the Mie scattered light L4, included in the scattered light L3 concentrated by the condensing lens 30, that has passed through the optical element 10, and outputs a signal corresponding to the intensity of light received. The intensity of light received is the intensity of the Mie scattered light L4 and, for example, is expressed by the signal level of the signal that is outputted by the photodetector 50.

The photodetector 50 is a photoelectric conversion element and, for example, is a PMT (photomultiplier tube). Alternatively, the photodetector 50 may have a PMT and a photon counter. Alternatively, the photodetector 50 may be an avalanche photodiode.

The analyzer 60 analyzes the signal outputted from the photodetector 50 and thereby analyzes the aerosol contained in the scatterer 90. For example, the analyzer 60 determines the presence or absence of and the concentration of the aerosol on the basis of the signal level of the signal. Specifically, the analyzer 60 determines the concentration of the aerosol corresponding to the signal level with reference to coordinate information associating the signal level with the concentration of the aerosol. The coordinate information is stored in advance in, for example, a memory (not illustrated) that the analyzer 60 includes. The analyzer 60 is an example of a signal processing circuit.

Further, the analyzer 60 computes the distance to the aerosol by a TOF (time-of-flight) analysis on the basis of the time required to receive the Mie scattered light L4 since the emitted light L2 was emitted. The analyzer 60 identifies the location of the aerosol in the target space on the basis of the distance thus computed and the direction in which the emitted light L2 was emitted. By repeating identification of the location of the aerosol while changing the direction of emission of the emitted light L2, the analyzer 60 creates a distribution of the aerosol in the target space.

The analyzer 60 is constituted by one or more electronic circuits including a plurality of circuit components. The one or more electronic circuits may each be a general-purpose circuit or may each be a dedicated circuit. That is, a function that the analyzer 60 executes is implemented as hardware such as an electronic circuit. Alternatively, the analyzer 60 may be implemented as, for example, a nonvolatile memory in which a program is stored, a volatile memory serving as a transitory storage area in which to execute a program, an I/O port, or a processor that executes a program. The function that the analyzer 60 executes may be implemented as software that is executed by a processor.

The constituent elements of the aerosol measurement apparatus 1 are housed in, for example, a housing (not illustrated). The housing is the outer-shell housing of the aerosol measurement apparatus 1, and has a light blocking effect. The housing is provided with an opening through which the emitted light L2 and the scattered light L3 are allowed to pass. These openings may be provided one by one separately in correspondence with the emitted light L2 and the scattered light L3. The condensing lens 30 may be provided in the opening.

2. Operation

Figure 2:
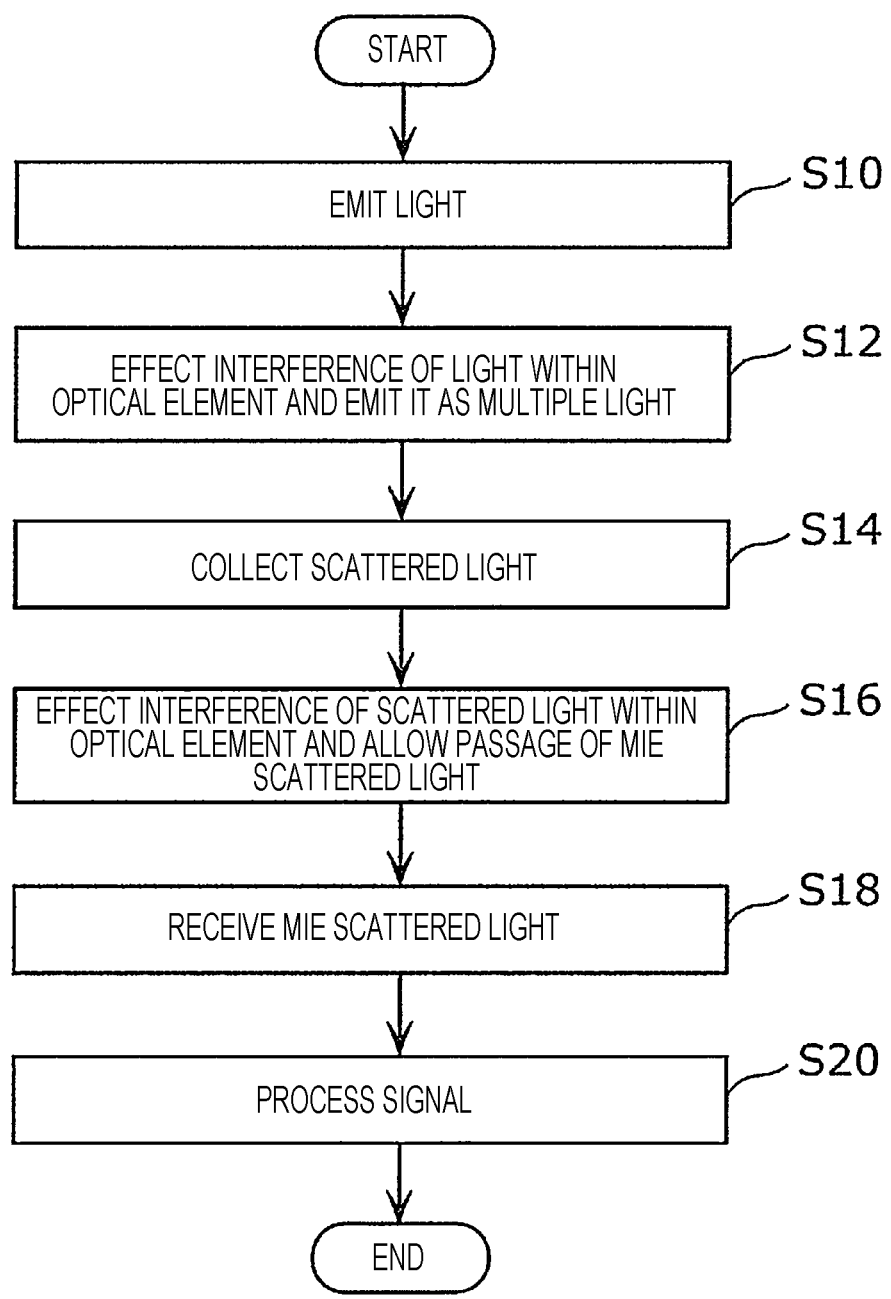
FIG. 2 is a diagram showing an operation of the aerosol measurement apparatus according to Embodiment 1.

The following describes an operation of the aerosol measurement apparatus 1 with reference to FIG. 2. FIG. 2 is a flow chart showing an operation of the aerosol measurement apparatus 1 according to the present embodiment.

As shown in FIG. 2, first, the light source 20 emits the emitted light L1 (S10). By passing through the optical element 10, the emitted light L1 is converted into multiple light that is light having a plurality of peaks at equal frequency intervals. That is, the optical element 10 causes incident light to interfere in the interior thereof and emits it as light having a plurality of peaks at equal frequency intervals (S12). The emitted light L2, which is multiple light, is emitted into the atmosphere and scattered by the scatterer 90.

Next, the condensing lens 30 concentrates the scattered light L3 generated from the scatterer 90 (S14). By passing through the optical element 10, the scattered light L3 concentrated by the condensing lens 30 has its Mie scattered light L4 extracted. That is, the scattered light concentrated by the condenser passes through the optical element 10 while being subjected to interference in the interior of the optical element 10 (S16). In other words, the optical element 10 substantially eliminates Rayleigh scattered light from the scattered light L3 and allows passage of only the Mie scattered light L4.

Next, the photodetector 50 receives the Mie scattered light L4 and outputs a signal corresponding to the intensity of light received (S18).

The analyzer 60 analyzes an aerosol contained in the scatterer 90 by processing the signal outputted from the photodetector 50 (S20).

The aerosol measurement apparatus 1 repeatedly performs the foregoing process from step S10 to step S20 while changing the direction of emission of the emitted light L2. For example, the aerosol measurement apparatus 1 emits the emitted light L2 toward a predetermined position in the target space and, upon acquiring the scattered light L3, identifies the location and concentration of the aerosol contained in the scatterer 90 from which the scattered light L3 was generated. By so doing, the aerosol measurement apparatus 1 can for example generate a distribution map that shows the location and concentration of the aerosol in the target space. Alternatively, the aerosol measurement apparatus 1 may generate a distribution map that shows only the location of the aerosol.

3. Function of Optical Element

The following describes a specific function of the optical element 10.

As mentioned above, the optical element 10 causes the emitted light L1, which is laser light emitted from the light source 20, to interfere in the interior thereof and emits it as the emitted light L2, which is multiple laser light composed of light having a plurality of peaks at equal frequency intervals. In the following, first, multiple laser light is described with reference to FIGS. 3A and 3B.

Figure 3A:
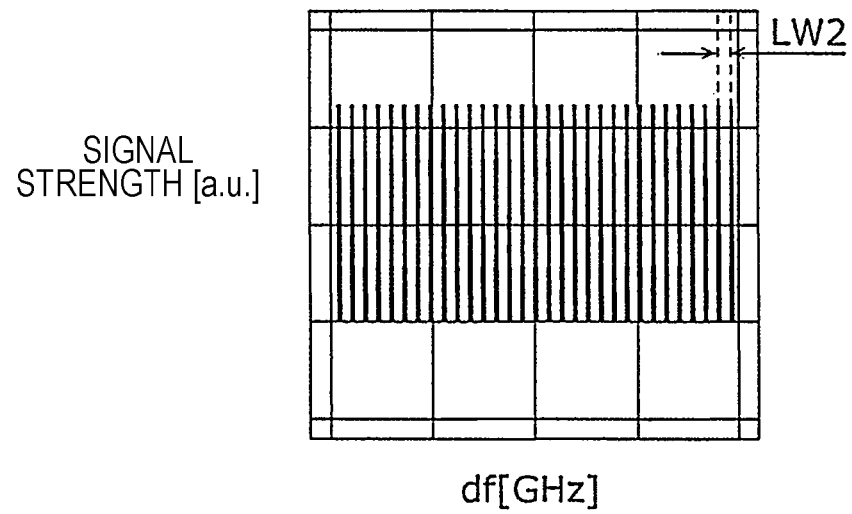
FIG. 3A is a diagram showing an example of a spectrum of multiple laser light that is emitted by the aerosol measurement apparatus according to Embodiment 1.
Figure 3B:
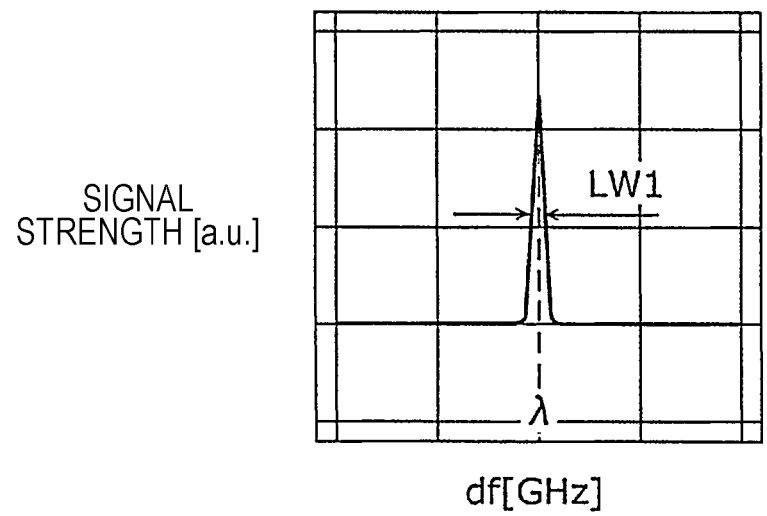
FIG. 3B is a diagram showing an example of a spectrum of multiple laser light that is emitted by the aerosol measurement apparatus according to Embodiment 1.

FIGS. 3A and 3B are diagrams showing an example of a spectrum of multiple laser light that is emitted by the aerosol measurement apparatus 1 according to the present embodiment. In each of FIGS. 3A and 3B, the horizontal axis represents frequency, and the vertical axis represents signal strength.

FIG. 3A shows a spectrum of the emitted light L2, which is multiple laser light having passed through the optical element 10. A plurality of peaks included in the spectrum correspond to the plurality of peaks included in the emitted light L2, respectively. The plurality of peaks are at equal frequency intervals LW2 of, for example, 3 GHz. In the example illustrated here, the plurality of peaks are equal in signal strength to one another. Alternatively, the plurality of peaks may be different in signal strength from one another. The emitted light L2 has a center wavelength k of, for example, 405 nm.

FIG. 3B is an enlarged view of only one peak of the spectrum, i.e. one ray of light included in the emitted light L2, of FIG. 3A. The ray of light has a full width at half maximum LW1 of, for example, 360 MHz. LW1 is greater than or equal to 1/20 of LW2 and less than or equal to 1/5 of LW2. Alternatively, LW1 may be greater than or equal to 1/10 of LW2 and less than or equal to 1/8 of LW2.

In the present embodiment, by passing through the optical element 10, the emitted light L1 is subjected to interference within the optical element 10 and emitted as the emitted light L2, which is interfering light. The etalon serving as the optical element 10 utilizes interference between incident light and light repeatedly reflected within the etalon. The incident light and the light repeatedly reflected within the etalon are in phase with each other, interference occurs in which these lights reinforce each other, so that the light within the etalon is transmitted with enhancement. The multilayer film 13 of the etalon can both transmit and reflect light. An example of the transmittance of the multilayer film 13 is, but is not limited to, 75%.

FIGS. 4 and 5 are each a diagram for explaining lights that pass through the optical element 10 of the aerosol measurement apparatus 1 according to the present embodiment. Specifically, FIG. 4 schematically represents a zeroth transmitted light and a first transmitted light. FIG. 5 schematically represents the zeroth transmitted light and a second transmitted light.

The optical element 10 transmits a portion of the incident light as-is. As shown in FIGS. 4 and 5, the zeroth transmitted light is light that is transmitted as-is without being reflected off the multilayer film 12 or 13 of the optical element 10.

As shown in FIG. 4, the first transmitted light is light produced by the incident light being reflected off the multilayer film 13 once and then reflected off the multilayer film 12 once. Interference occurs when the zeroth transmitted light and the first transmitted light are in phase with each other, and light corresponding to a first interference fringe is emitted. Interference fringes will be described later with reference to FIGS. 7 and 8.

As shown in FIG. 5, the second transmitted light is light produced by the incident light being reflected off the multilayer film 13 twice and reflected off the multilayer film 12 twice. Interference occurs when the zeroth transmitted light and the second transmitted light are in phase with each other, and light corresponding to a second interference fringe is emitted.

In a case where the incident light and the repeatedly-reflected light are not in phase with each other, the light is reflected off the multilayer film 13 toward the multilayer film 12, so that less light passes through the etalon. As a result, the transmitted light has a periodic spectrum. That is, upon entrance of the emitted light L1, the optical element 10 can emit the emitted light L2, which has equal frequency intervals LW2.

The length $\Delta x$ of the etalon required to achieve the frequency intervals LW2 is defined on the basis of Formula (1) below. As shown in FIGS. 4 and 5, the length $\Delta x$ of the etalon is the distance between the multilayer film 12 and the multilayer film 13, i.e. the thickness of the translucent section 11.

$$\Delta x = \frac{1}{2} \times \frac{N_0}{N_1} \times \frac{C}{LW2} \quad (1)$$

In Formula (1), No is the refractive index in vacuum and, for example, is 1.0. Ni is the refractive index of the translucent section 11 of the etalon and, in the case of quartz, is 1.47. c is the speed of light, which is $3 \times 10^8$ m/s. In a case where LW2=3 GHz, the length $\Delta x$ of the etalon is 34 mm according to Formula (1) above. Further, for convenience in manufacturing, the length $\Delta x$ of the etalon is at most approximately 80 mm. For this reason, LW2 is at lowest approximately 1.3 GHz.

An optical path difference dx at which Fabry-Perot interference is effected by the etalon is expressed by Formula (2) below.

$$dx = 2 \times \Delta x \times \frac{N_1}{N_0} \quad (2)$$

For example, in a case where $\Delta x=34$ mm, the optical path difference dx is 100 mm.

Next, scattered light L3 generated by the scatterer 90 scattering the emitted light L2 shown in FIGS. 3A and 3B is described with reference to FIGS. 6A and 6B.

Figure 6A:
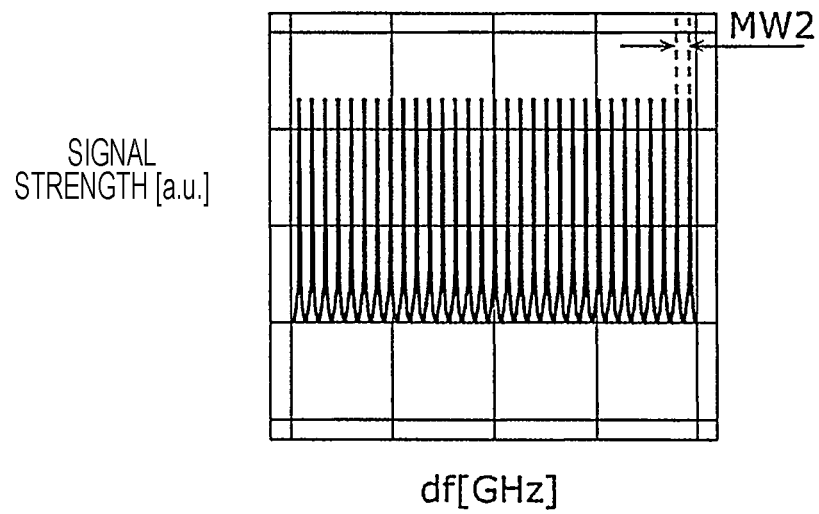
FIG. 6A is a diagram showing an example of a spectrum of scattered light generated by scattering multiple laser light emitted by the aerosol measurement apparatus according to Embodiment 1.
Figure 6B:
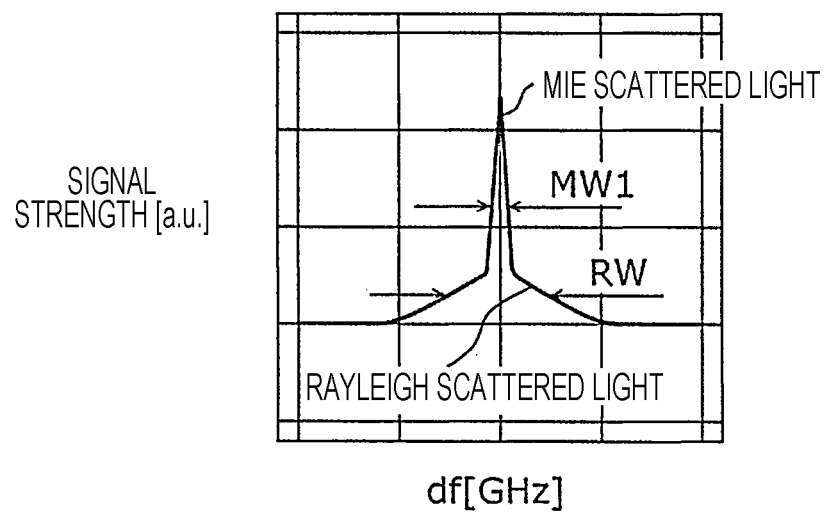
FIG. 6B is a diagram showing an example of a spectrum of scattered light generated by scattering multiple laser light emitted by the aerosol measurement apparatus according to Embodiment 1.

FIGS. 6A and 6B are diagrams showing an example of a spectrum of scattered light L3 generated by scattering multiple laser light emitted by the aerosol measurement apparatus 1 according to the present embodiment. In each of FIGS. 6A and 6B, the horizontal axis represents frequency, and the vertical axis represents signal strength.

FIG. 6A shows a spectrum of the scattered light L3. As is the case with the emitted light L2, the scattered light L3 is composed of light having a plurality of peaks at equal frequency intervals MW2. A plurality of peaks included in the spectrum correspond to the plurality of peaks included in the emitted light L2, respectively. The frequency intervals MW2 of the scattered light L3 are equal to the frequency intervals LW2 of the emitted light L2. In the example illustrated here, the plurality of peaks are equal in signal strength to one another. Alternatively, the plurality of peaks may be different in signal strength from one another.

FIG. 6B is an enlarged view of only one peak of the spectrum, i.e. one ray of light included in the scattered light L3, of FIG. 6A.

As mentioned above, the scattered light L3 includes Mie scattered light and Rayleigh scattered light. A spectrum of the Mie scattered light is substantially the same as a spectrum of the emitted light L2 before scattering. Meanwhile, the Rayleigh scattered light becomes wider in frequency width due to a thermal motion of molecules that make up the atmosphere. Further, the Rayleigh scattered light is usually lower in intensity than the Mie scattered light.

For this reason, as shown in FIG. 6B, the spectrum of the scattered light L3 has a peak shaped to have wider skirts than the peak of the spectrum of the emitted light L2 shown in FIG. 3B. The high peak in the center corresponds to the Mie scattered light, and the skirts correspond to the Rayleigh scattered light. FIG. 6B assumes that the ratio of the signal strength of the Rayleigh scattered light scattered by the molecules that make up the atmosphere to the signal strength of the Mie scattered light scattered by the aerosol is 3:1. The signal strength here is expressed by the area of the peak. Further, the full width at half maximum MW1 of the peak that represents the Mie scattered light is equal to the full width at half maximum LW1 of the emitted light L2.

The full width at half maximum RW of the skirts that represent the Rayleigh scattered light is known by general actual measurement to be in the range of approximately 3.4 GHz to 3.9 GHz. As one example, the full width at half maximum RW of the Rayleigh scattered light can be 3.6 GHz ($\Delta\lambda=1.9$ pm).

$\Delta\lambda$ is computed on the basis of Formula (3) below.

$$\Delta\lambda = \frac{c}{f} - \frac{c}{f+\Delta f} \approx C \times \frac{\Delta f}{f^2} = \Delta f \times \frac{\lambda^2}{c}$$

In Formula (3), $\Delta f = RW$. c is the speed of light, which is $3\times10^8$ m/s. $\lambda$ is the center wavelength, which is 405 nm here.

In the present embodiment, the passage of the scattered light L3 through the optical element 10 makes it possible to transmit the Mie scattered light, which is light having a plurality of peaks appearing at frequency intervals of 3 GHz, and eliminate the Rayleigh scattered light, which is light of the other frequency component.

Figure 7:
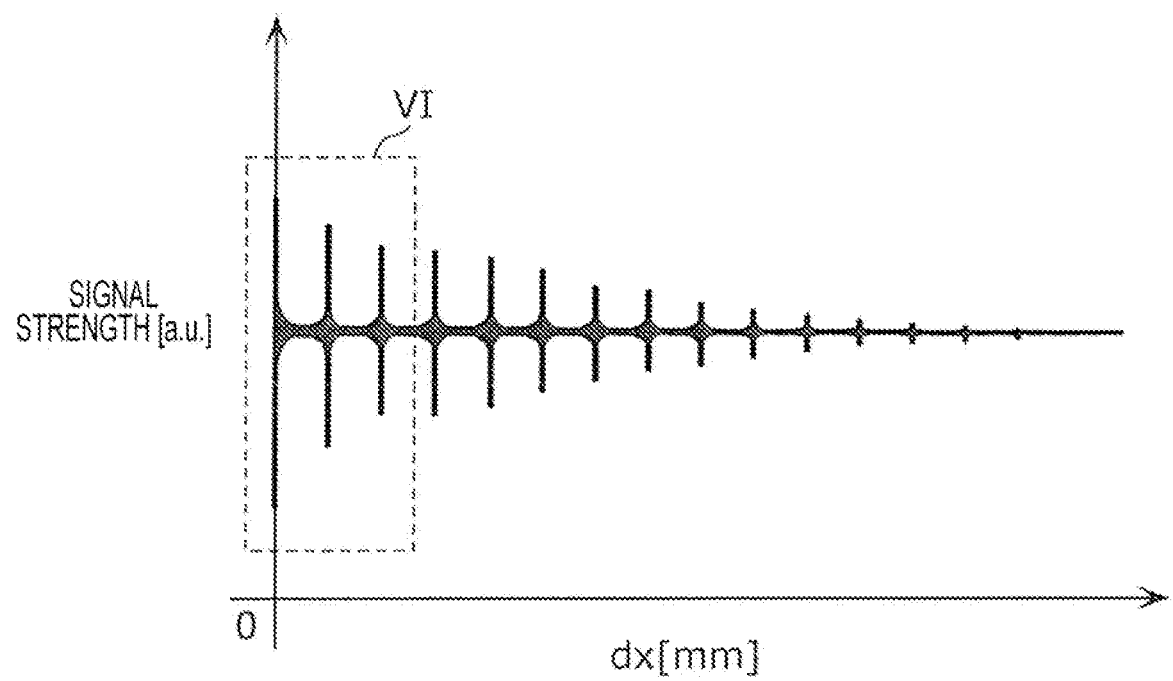
FIG. 7 is a diagram representing a result of calculation of an interferogram in a case where scattered light including Mie scattered light and Rayleigh scattered light is subjected to interference by a Michelson interferometer.
Figure 8:
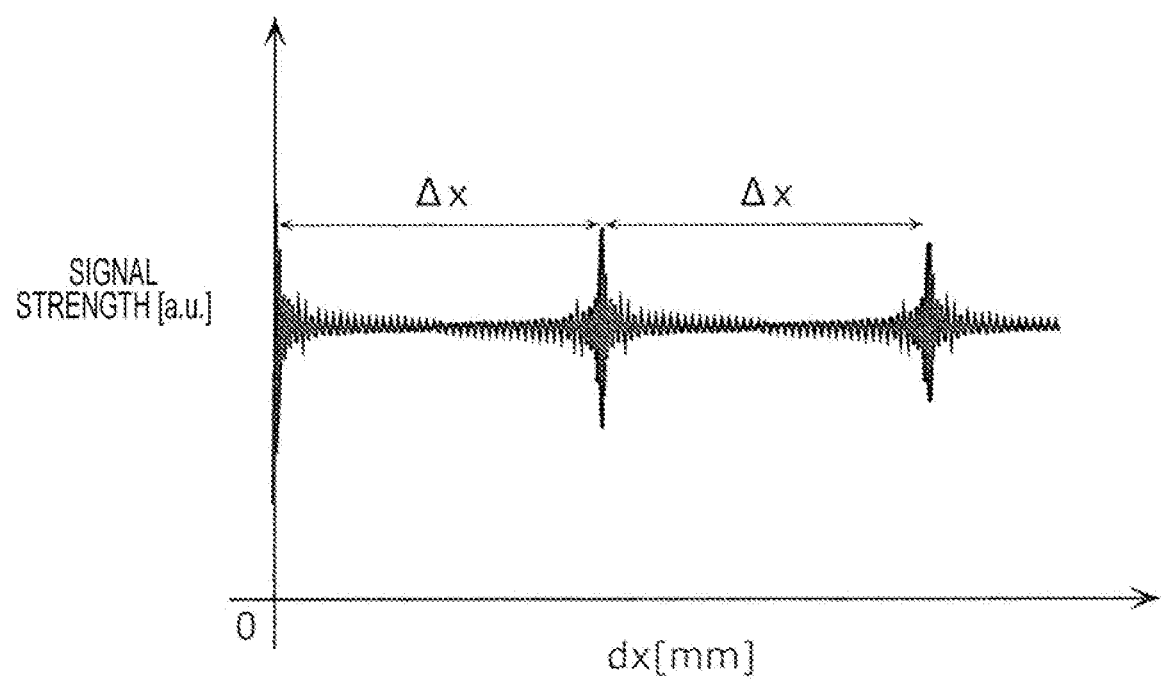
FIG. 8 is an enlarged view of a part of FIG. 7.

FIG. 7 is a diagram representing a result of calculation of an interferogram in a case where scattered light including Mie scattered light scattered by an aerosol and Rayleigh scattered light scattered by molecules that make up the atmosphere is subjected to interference by a Michelson interferometer. In FIG. 7, the horizontal axis represents the optical path different dx at which interference occurs, and the vertical axis represents the intensity of interfering light. FIG. 8 is an enlarged view of an area VI surrounded by dashed lines in FIG. 7.

As shown in FIGS. 7 and 8, an interference fringe appears every time the optical path difference dx becomes an integral multiple of $\Delta x$. The interference fringe at dx=0 is defined as a zeroth interference fringe, and the interference fringe at dx=n×$\Delta x$ is defined as an nth interference fringe. n is a natural number.

FIG. 8 represents the zeroth interference fringe, the first interference fringe, and the second interference fringe. The first interference fringe is light produced by interference between the zeroth transmitted light and the first transmitted light, which are shown in FIG. 4. The second interference fringe is light produced by interference between the zeroth transmitted light and the second transmitted light, which are shown in FIG. 5.

The photodetector 50 receives, as the Mie scattered light L4, interfering light produced by a combination of the zeroth to nth interference fringes. In the present embodiment, an interference fringe based on Rayleigh scattered light attributed to atmospheric scattering can be eliminated by adjusting the length $\Delta x$ of the etalon serving as the optical element 10. A method for determining the length $\Delta x$ appropriate to eliminating Rayleigh scattered light is described.

Figure 9:
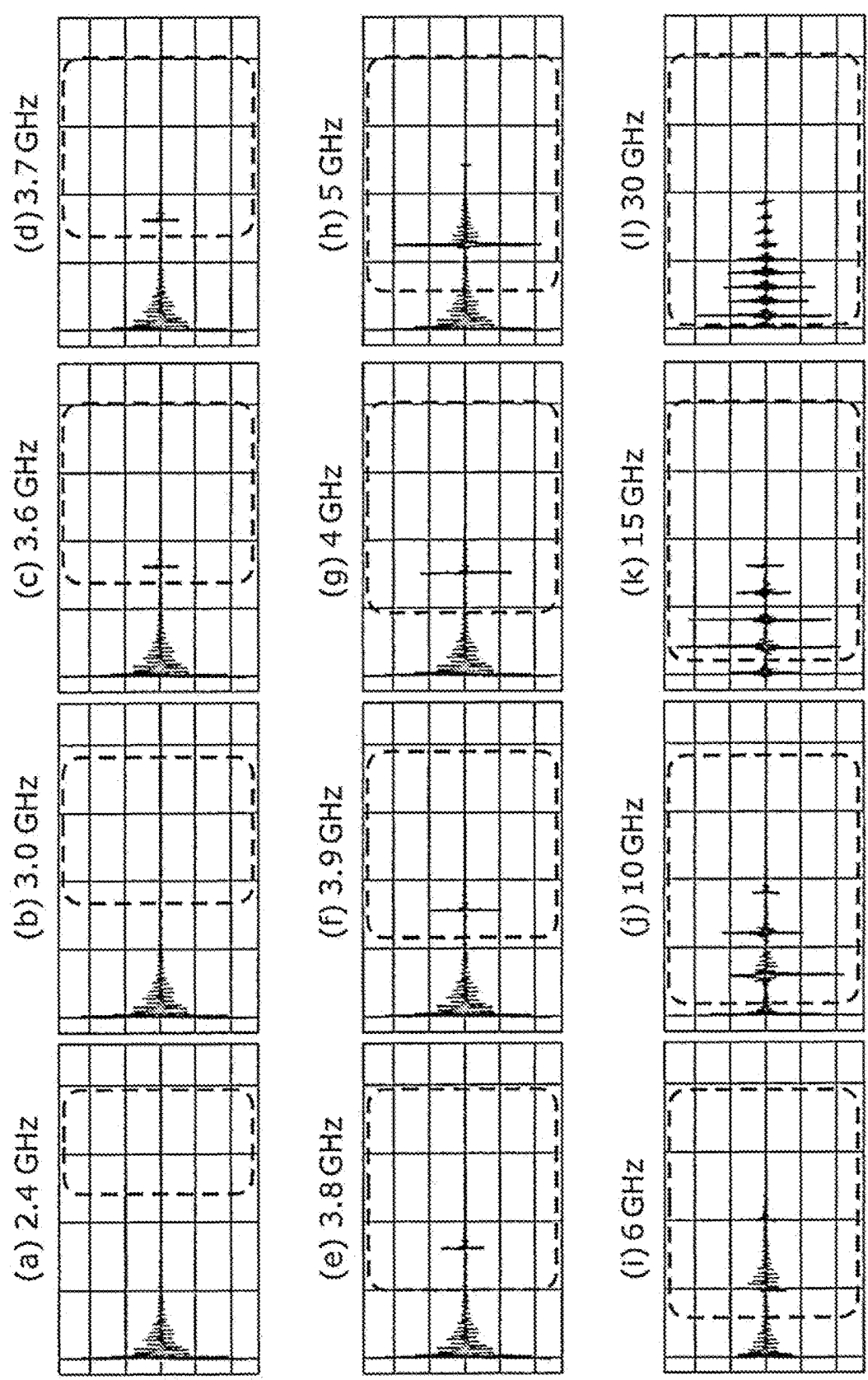
FIG. 9 is a diagram for explaining the frequency interval dependence of interference fringes formed by a Michelson interferometer with consideration given solely to atmospheric scattering without scattering by an aerosol.

FIG. 9 is a diagram for explaining the frequency interval dependence of interference fringes formed by a Michelson interferometer with consideration given solely to atmospheric scattering without scattering by an aerosol. In each of parts (a) to (I) of FIG. 9, the horizontal axis represents dx, and the vertical axis represents signal strength. Parts (a) to (I) of FIG. 9 represent results of calculation of interferograms in cases where the frequency intervals LW2 of the emitted light L2 are 2.4 GHz, 3.0 GHz, 3.6 GHz, 3.7 GHz, 3.8 GHz, 3.9 GHz, 4 GHz, 5 GHz, 6 GHz, 10 GHz, 15 GHz, and 30 GHz, respectively.

As shown in FIG. 9, the number of interference fringes that appear increases and the signal strength of an interference fringe that appears becomes higher as the frequency intervals LW2 become larger. For example, in a case where the frequency intervals LW2 are 2.4 GHz, substantially only the zeroth interference fringe appears, and the first and subsequent interference fringes do not appear. With the frequency intervals LW2 in the range of 3.0 GHz to 4 GHz, the zeroth and first interference fringes appear, and the second and subsequent interference fringes do not appear. In a case where the frequency intervals LW2 are 5 GHz, the second interference fringe appears in addition to the zeroth and first interference fringes. FIG. 9 uses a dashed frame to represent an area in which the first interference fringe appears or in which the first and subsequent interference fringes appear.

The appearance of the second and subsequent fringes in a case where only atmospheric scattering is taken into account means that interference occurs due solely to Rayleigh scattered light. This means that in a case where the Rayleigh scattered light is allowed to enter the optical element 10, the Rayleigh scattered light is transmitted. Accordingly, with the frequency intervals LW2 being less than or equal to 3.9 GHz, the first interference fringe becomes smaller, so that the transmission of the Rayleigh scattered light is inhibited.

That is, the magnitude of the first interference fringe in a case where the frequency intervals LW2 are 3.9 GHz is below 50% of the magnitude of the first interference fringe in a case where the frequency intervals LW2 are 5 GHz. This makes it possible to inhibit the Rayleigh scattered light from being transmitted through the optical element 10, as the first interference fringe is smaller.

For these reasons, the Rayleigh scattered light can be efficiently eliminated from the scattered light L3 when the frequency intervals LW2 are less than or equal to 3.9 GHz. In a case where the frequency intervals LW2 are less than or equal to 3.9 GHz, the length $\Delta x$ of an etalon made of quartz is approximately 26 mm according to Formula (1). That is, by using as the optical element 10 an etalon whose length $\Delta x$ is greater than or equal to 26 mm, the Rayleigh scattered light can be efficiently eliminated, and the precision of measurement of an aerosol can be increased.

4. Modification

The following describes a modification of Embodiment 1.

In Embodiment 1, the emitted light L1 and the scattered light L3 enters the optical element 10 through different surfaces. In the present modification, on the other hand, the emitted light L1 and the scattered light L3 enters the optical element 10 through the same surface. In the following, a description is given with a focus on points of difference from Embodiment 1, and a description of common features is omitted or simplified.

Figure 10:
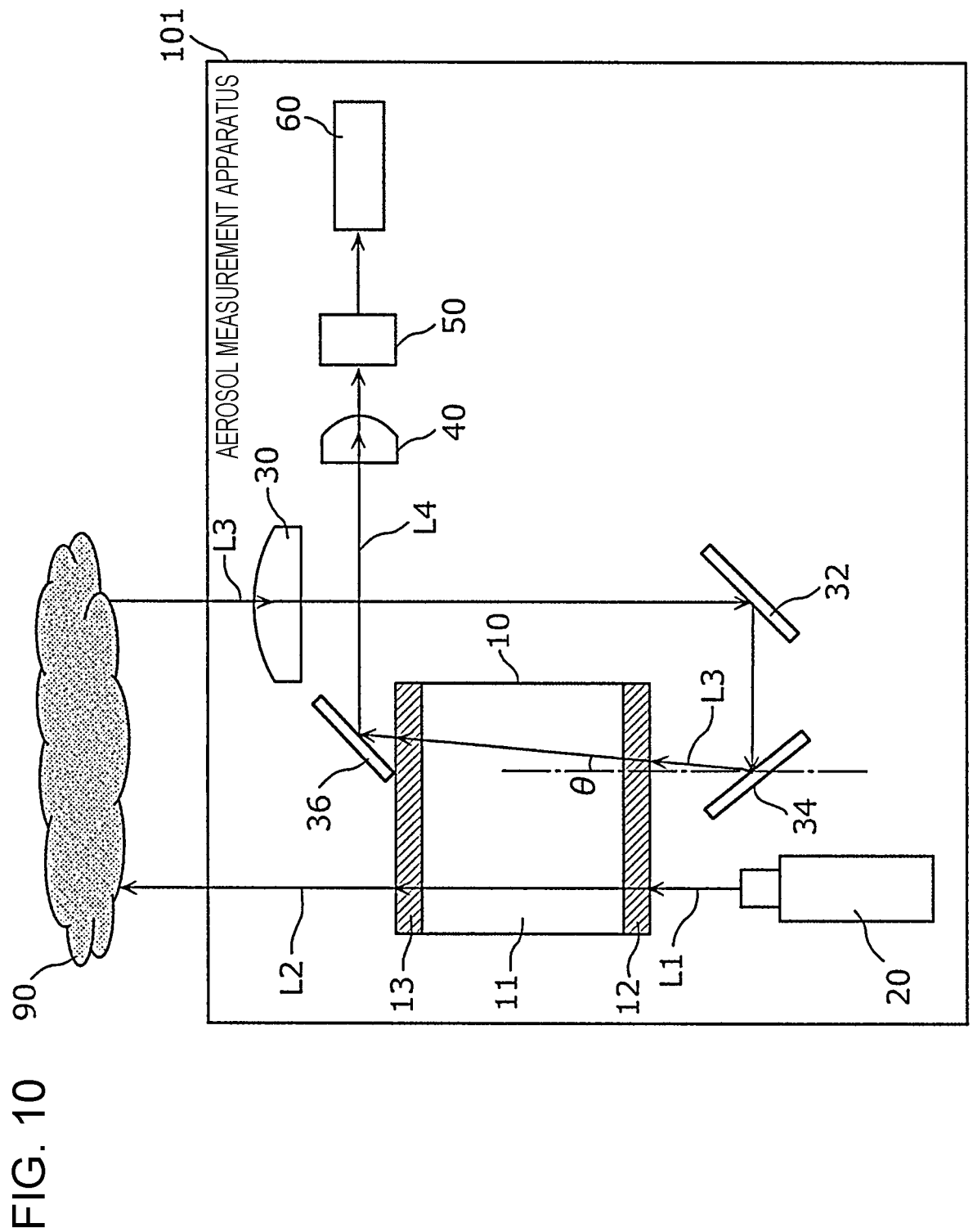
FIG. 10 is a diagram showing a configuration of an aerosol measurement apparatus according to a modification of Embodiment 1.

FIG. 10 is a diagram showing a configuration of an aerosol measurement apparatus 101 according to the present modification. As shown in FIG. 10, the aerosol measurement apparatus 101 includes mirrors 32, 34, and 36 instead of the mirror 22 as compared with the aerosol measurement apparatus shown in FIG. 1. Further, the light source 20, the condensing lens 40, the photodetector 50, and the analyzer 60 are different in placement from those of Embodiment 1.

As shown in FIG. 10, the mirrors 32 and 34 reflect the scattered light L3 concentrated by the condensing lens 30. Placing the mirrors 32 and 34 at appropriate angles with respect to the scattered light L3 makes it possible to bend the scattered light L3 so that the scattered light L3 travels in a desired direction. In the present embodiment, the mirrors 32 and 34 reflect the scattered light L3 so that the scattered light L3 enters the optical element 10.

This causes both the emitted light L1 and the scattered light L3 to enter the optical element 10 through the multi-layer film 12. That is, the emitted light L1 and the scattered light L3 enter the optical element 10 through the first surface and exit the optical element 10 through the second surface opposite to the first surface. Causing the emitted light L1 and the scattered light L3 to enter through the same surface makes it possible to easily separate the paths of light within the optical element 10.

The mirror 36 reflects the Mie scattered light L4, which has passed through the optical element 10. Placing the mirror 36 at an appropriate angle with respect to the Mie scattered light L4 makes it possible to bend the Mie scattered light L4 so that the Mie scattered light L4 travels in a desired direction. In the present embodiment, the Mie scattered light L4 is reflected to fall on the photodetector 50 via the condensing lens 40.

This makes it possible to place the light source 20 and the photodetector 50 at a distance from each other as shown in FIG. 10. Specifically, this makes it hard for reflected light produced by the optical element 10 reflecting the emitted light L1 emitted from the light source 20 to fall on the photodetector 50. The reflected light becomes a factor for false detection of an aerosol. Further, the reflected light, which is higher in intensity than scattered light, may also become a factor for a failure in the photodetector 50 by exceeding a critical strength that the photodetector 50 can detect. For this reason, the present modification makes it possible to inhibit, for example, false detection of an aerosol and a failure in the photodetector 50 due to such reflected light.

Further, in the present modification, the scattered light L3 enters the optical element 10 obliquely after having been reflected by the mirror 34. The angle of incidence of the scattered light L3 is for example less than or equal to 5 degrees. For this reason, the optical path difference dx at which Fabry-Perot interference occurs when the scattered light L3 passes through the inside of the optical element 10 is expressed by Formula (4) below.

$$dx = 2 \times \Delta x \times \frac{N_1}{N_0} \times \frac{1}{\cos\theta} \quad (4)$$

At this point in time, the amount of change Δdx from the case where θ=0 is expressed by Formula (5).

$$\Delta dx = 2 \times \Delta x \times \frac{N_1}{N_0} \times \left(1 - \frac{1}{\cos\theta}\right) \quad (5)$$

By adjusting the amount of change Δdx in optical path difference so that it becomes an integral multiple of the wavelength k of light that is emitted by the light source 20, an adjustment can be made to a bright point of interference due to a wavelength within an interference fringe.

Embodiment 2

The following describes Embodiment 2.

In Embodiment 2, the photodetector 50 has a function of blocking incident light for a predetermined period of time. In the following, a description is given with a focus on points of difference from Embodiment 1, and a description of common features is omitted or simplified.

Figure 11:
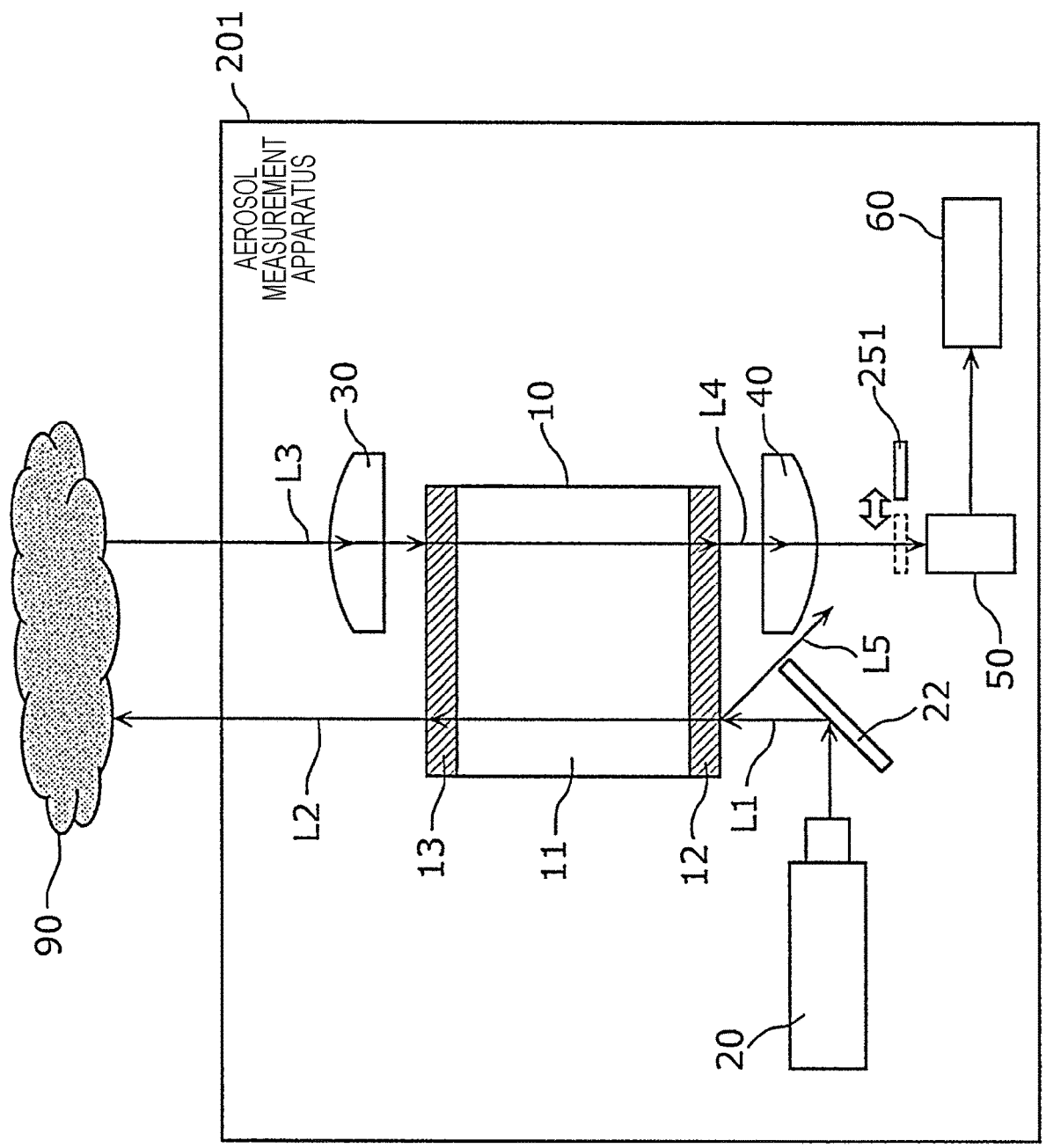
FIG. 11 is a diagram showing a configuration of an aerosol measurement apparatus according to Embodiment 2.

FIG. 11 is a diagram showing a configuration of an aerosol measurement apparatus 201 according to the present embodiment. As shown in FIG. 11, the aerosol measurement apparatus 201 further includes a light shield 251 as compared with the aerosol measurement apparatus 1 shown in FIG. 1.

The light shield 251 blocks the emitted light L1 emitted by the light source 20. The light shield 251 is for example a movable light-blocking shutter. As indicated by an outline double-pointed arrow in FIG. 11, the light shield 251 is movable between a position in which it covers the photosensitive surface of the photodetector 50 and a position in which it does not cover the photosensitive surface. The position indicated by dashed lines in FIG. 11 is the position in which the light shield 251 covers the photosensitive surface, and the coverage of the photosensitive surface with the light shield 251 makes it possible to block light from falling on the photodetector 50. Further, in a case where the light shield 251 does not cover the photosensitive surface, light can fall on the photodetector 50. The position of the light shield 251 is controlled by the photodetector 50.

Figure 12:
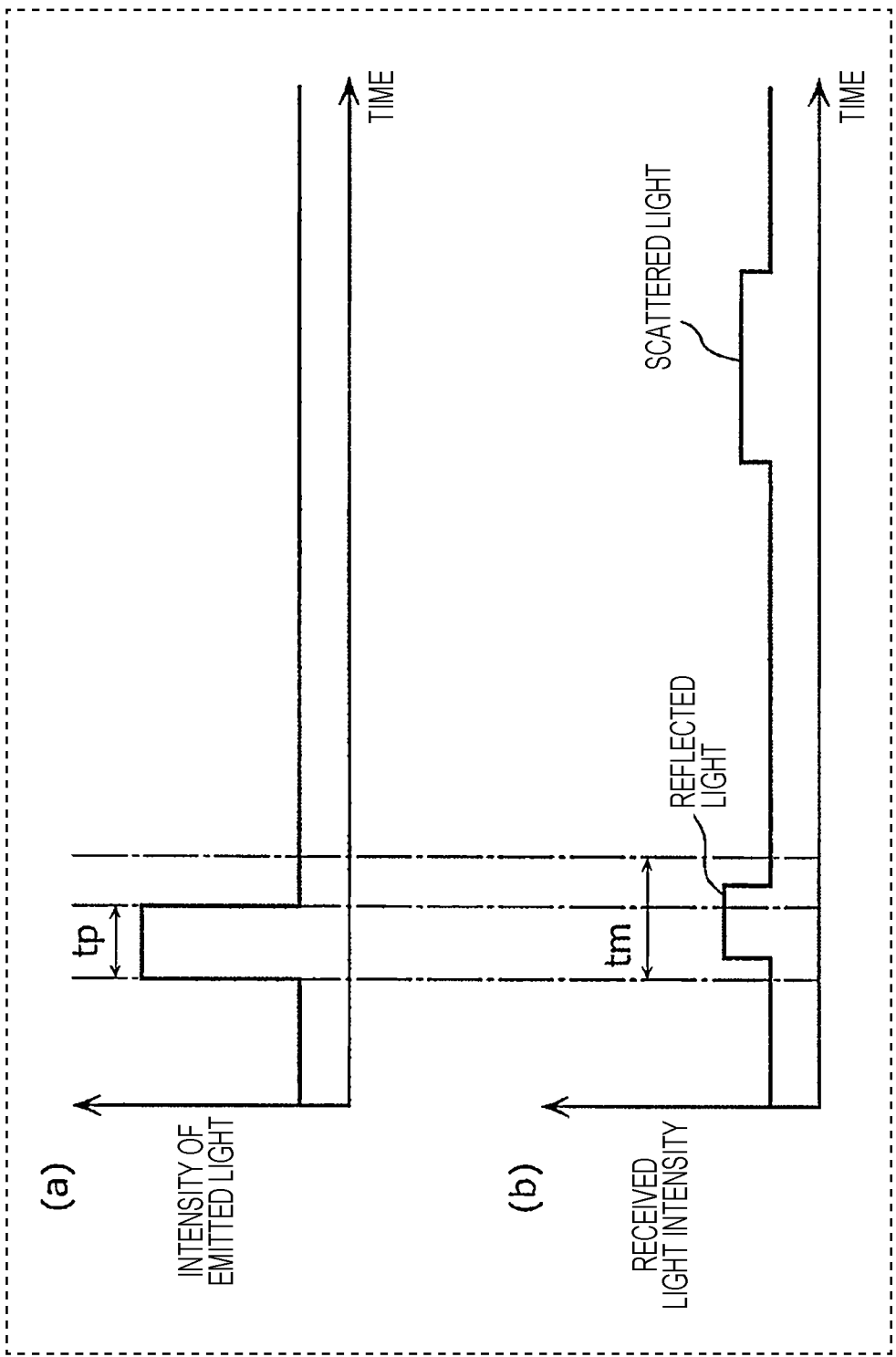
FIG. 12 is a diagram for explaining an operation of a light shield of the aerosol measurement apparatus according to Embodiment 2.

FIG. 12 is a diagram for explaining an operation of the light shield 251 of the aerosol measurement apparatus 201 according to the present embodiment. In part (a) of FIG. 12, the horizontal axis represents time, and the vertical axis represents the intensity of the emitted light L1. In part (b) of FIG. 12, the horizontal axis represents time, and the vertical axis represents the intensity of light received by the photodetector 50.

As shown in part (a) of FIG. 12, the light source 20 emits pulsed emitted light L1. The duration of time tp of the emitted light L1 is for example 10 nanoseconds. For example, the light source 20 periodically emits pulsed emitted light L1 having a duration of time tp. Intervals at which the emitted light L1 is emitted, i.e. time intervals between pulses, are not limited to particular intervals, but are longer than the time required for light to travel twice the maximum distance at which an aerosol can be detected.

In a case where the emitted light L1 is incident on the optical element 10, a portion of the light is not transmitted through the optical element 10 but reflected as reflected light L5 toward the positon from which the light is incident, as shown in FIG. 11. In a case where this reflected light L5 has been received by the photodetector 50, a signal corresponding to the intensity of the reflected light L5 is outputted, as shown in part (b) of FIG. 12.

Since the distance between the optical element 10 and the photodetector 50 is sufficiently shorter than the distance between the scatterer 90 and the photodetector 50, the reflected light L5 from the optical element 10 is received by the photodetector 50 within a period of time from emission of the emitted light L1 to reception of the Mie scattered light L4.

For this reason, in the present embodiment, the photodetector 50 controls the light shield 251 to block reception of light until a predetermined period of time tm has elapsed since the emitted light L1 was emitted. The period of time tm is a period of time that is longer than the duration of time tp of the pulsed emitted light L1. For example, the period of time tm is 10.1 nanoseconds. The period of time tm starts at the same point of time as the emission of the emitted light L1.

Thus, the aerosol measurement apparatus 201 according to the present embodiment makes it possible to inhibit, for example, false detection of an aerosol due to reflected light and a failure in the photodetector 50 due to saturation.

Although the present embodiment has illustrated an example in which light incident on the photodetector 50 is physically blocked, this does not imply any limitation. For example, of signals that are outputted from the photodetector 50, a signal corresponding to reflected light may be ignored by the analyzer 60 or does not need to be used for analysis of an aerosol. Alternatively, the photodetector 50 does not need to output a signal during the period of time tm. That is, the aerosol measurement apparatus 201 may block light incident on the photodetector 50 in a signal-processing manner.

Embodiment 3

The following describes Embodiment 3.

Embodiment 1 has illustrated an example in which emitted light L1 and scattered light L3 enter a single optical element 10. In Embodiment 3, on the other hand, emitted light L1 and scattered light L3 enter optical elements differing from each other. In the following, a description is given with a focus on points of difference from Embodiment 1, and a description of common features is omitted or simplified.

Figure 13:
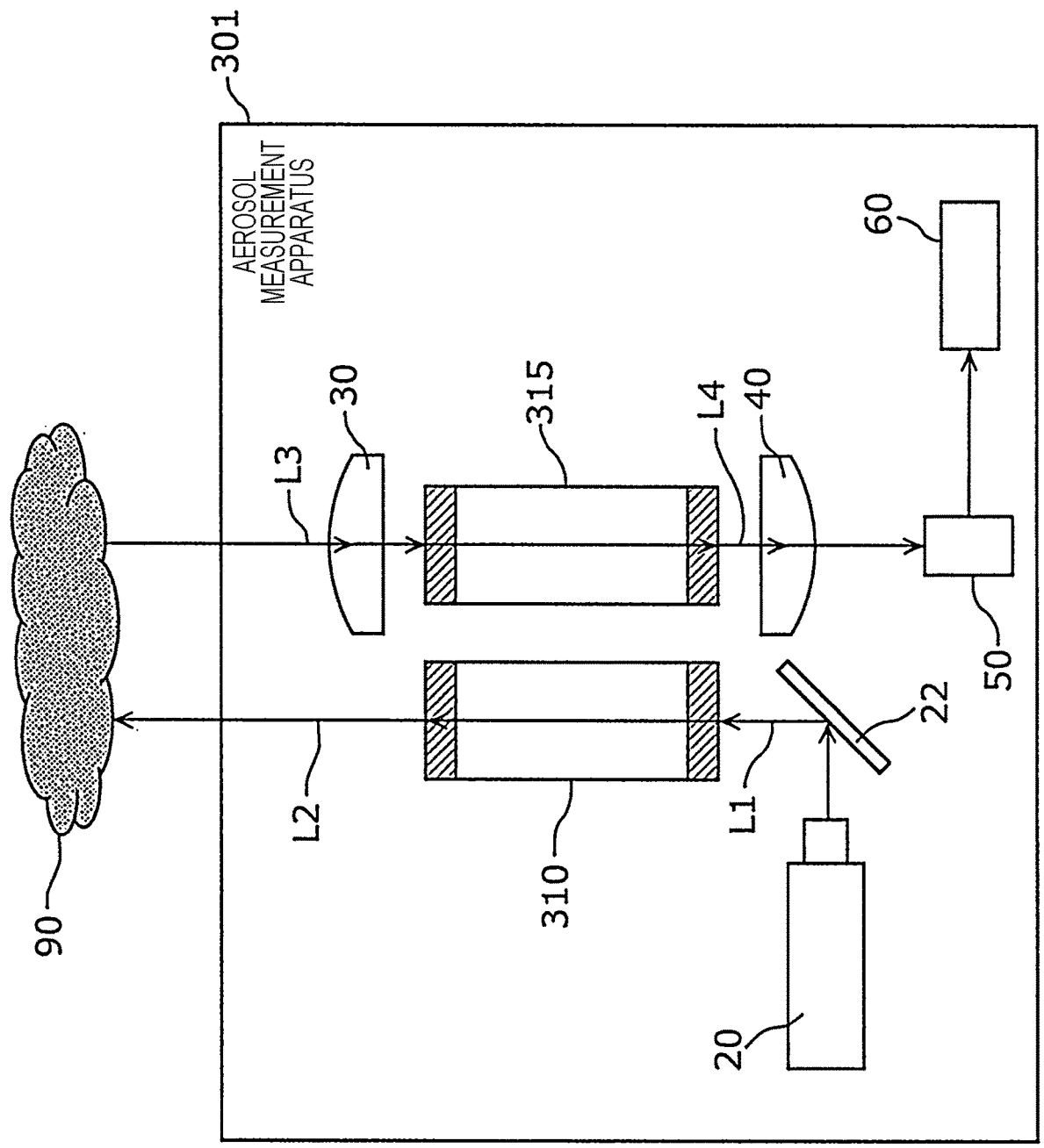
FIG. 13 is a diagram showing a configuration of an aerosol measurement apparatus according to Embodiment 3.

FIG. 13 is a diagram showing a configuration of an aerosol measurement apparatus 301 according to the present embodiment. As shown in FIG. 13, the aerosol measurement apparatus 301 includes two optical elements 310 and 315 instead of the optical element 10 as compared with the aerosol measurement apparatus 1 shown in FIG. 1.

The optical elements 310 and 315 are examples of first and second optical elements having the same optical properties as each other. For example, each of the optical elements 310 and 315 has the same optical properties as the optical element 10 according to Embodiment 1, causes incident light to interfere in the interior thereof, and emits it as light having a plurality of peaks at equal frequency intervals. In a case where the same light enters each of the optical elements 310 and 315, light is emitted from the optical element 310 at frequency intervals which are the same as those at which light is emitted from the optical element 315. The optical elements 310 and 315 are etalons having the same optical properties.

Further, as in the case of Embodiment 1, the frequency intervals of light may be less than or equal to 3.9 GHz.

In the present embodiment, the optical element 310 is located on the optical path of the emitted light L1. The optical element 310 causes the incident emitted light L1 to interfere in the interior thereof and emits it as the emitted light L2, which is multiple light, into the atmosphere. The optical element 310 corresponds to the first portion 10a of the optical element 10 according to Embodiment 1.

The optical element 315 is located on the optical path of the scattered light L3. The optical element 315 causes the scattered light L3 concentrated by the condensing lens 30 to interfere in the interior thereof and allows passage of the Mie scattered light L4. That is, the optical element 315 eliminates the Rayleigh scattered light from the incident scattered light L3 and transmits the Mie scattered light L4. The optical element 315 corresponds to the second portion 10b of the optical element 10 according to Embodiment 1.

Since the aerosol measurement apparatus 301 according to the present embodiment includes the two optical elements 310 and 315, the optical path of the emitted light L1 and the optical path of the scattered light L3 can be easily separated from each other. Further, the degree of freedom in the design of placement of elements and paths of light within the aerosol measurement apparatus 301 can be increased.

Other Embodiments

In the foregoing, aerosol measurement apparatuses and aerosol measurement methods according to one or more aspects have been described with reference to embodiments; however, the present disclosure is not intended to be limited to these embodiments. Applications to the present embodiments of various types of modification conceived of by persons skilled in the art and embodiments constructed by combining constituent elements of different embodiments are encompassed in the scope of the present disclosure, provided such applications and embodiments do not depart from the spirit of the present disclosure.

For example, the optical element does not need to be an etalon. The optical element needs only be an element that effects Fabry-Perot interference, as is the case with an etalon.

Further, in each of the embodiments, a process that is executed by a particular processor may be executed by another processor. Further, the order of a plurality of processes may be changed, or a plurality of processes may be executed in parallel. Further, the assignment of the constituent elements of the aerosol measurement apparatus to the plurality of apparatuses is a mere example. For example, one apparatus may include the constituent elements of another apparatus. Further, the aerosol measurement apparatus may be implemented as a single apparatus.

For example, a process described in each of the embodiments may be realized by centralized processing using a single apparatus (system) or may be realized by decentralized processing using a plurality of apparatuses. Further, the program may be executed by a single processor or a plurality of processors. That is, centralized processing may be performed, or decentralized processing may be performed.

Further, in each of the embodiments described above, all or some of the constituent elements such as the analyzer may be configured by dedicated hardware or may be realized by executing a software program suited to that constituent element. Each of the constituent elements may be realized by a program executor such as a CPU (central processing unit) or a processor reading and executing a software program stored on a storage medium such as an HDD (hard disk drive) or a semiconductor memory.

Further, a constituent element such as the analyzer may be constituted by one or more electronic circuits. The one or more electronic circuits may each be a general-purpose circuit or may each be a dedicated circuit.

The one or more electronic circuits may include, for example, a semiconductor device, an IC (integrated circuit), an LSI (large-scale integrated circuit), or the like. The LSI or IC can be integrated into one chip, or also can be integrated into a plurality of chips. The name used here is LSI or IC, but it may also be called system LSI, VLSI (very large scale integration), or ULSI (ultra large scale integration) depending on the degree of integration. A Field Programmable Gate Array (FPGA) that can be programmed after manufacturing an LSI can be used for the same purpose.

It should be noted that general or specific embodiments may be implemented as a system, an apparatus, a method, an integrated circuit, or a computer program. Alternatively, general or specific embodiments may be implemented as a computer-readable non-transitory storage medium, such as an optical disk, an HDD, a semiconductor memory, having the computer program stored thereon. It should be noted that general or specific embodiments may be implemented as any selective combination of a system, an apparatus, a method, an integrated circuit, a computer program, and a storage medium.

Further, each of the embodiments described above is subject to various changes, substitutions, additions, omissions, and the like in the scope of the claims or the scope of equivalents thereof.

The present disclosure can be utilized, for example, as a small-sized aerosol measurement apparatus that makes it possible to easily measure an aerosol, and can be utilized, for example, for indoor measurements of harmful fine particles and outdoor meteorological observations.

What is claimed is:

1. An aerosol measurement apparatus for measuring an aerosol contained in a scatterer present in an atmosphere, the aerosol measurement apparatus comprising:
   a light source;
   an optical element (i) that irradiates the scatterer with interfering light produced by causing emitted light emitted from the light source to interfere in an interior of the optical element, the interfering light having a plurality of peaks spaced at frequency intervals equal to one another, and (ii) that emits Mie scattered light by causing scattered light generated in the scatterer to interfere in the interior; and
   a photodetector that receives the Mie scattered light and outputs a signal corresponding to an intensity of light received.

2. The aerosol measurement apparatus according to claim 1, wherein the optical element is an etalon.

3. The aerosol measurement apparatus according to claim 1, wherein the frequency intervals are less than or equal to 3.9 GHz.

4. The aerosol measurement apparatus according to claim 1, wherein the optical element has a first portion including a path through which the emitted light passes and a second portion including a path through which the scattered light passes and differing from the first portion.

5. The aerosol measurement apparatus according to claim 4, wherein
   the optical element has a first surface and a second surface opposite to the first surface, and
   the emitted light and the scattered light enter the optical element through the first surface.

6. The aerosol measurement apparatus according to claim 4, wherein
   the optical element has a first surface and a second surface opposite to the first surface,
   the emitted light enters the optical element through the first surface, and
   the scattered light enters the optical element through the second surface.

7. The aerosol measurement apparatus according to claim 1, wherein
   the emitted light is pulsed light, and
   the photodetector receives the Mie scattered light after having blocked reception of light until a period of time that is longer than a duration of time of the pulsed light has elapsed since the pulsed light was emitted.

8. The aerosol measurement apparatus according to claim 1, wherein the scattered light enters the optical element obliquely.

9. The aerosol measurement apparatus according to claim 1, wherein the light source is a laser element or a light-emitting diode.

10. The aerosol measurement apparatus according to claim 1, further comprising a condenser that concentrates the scattered light,
    wherein the condenser concentrates the scattered light before the scattered light interferes in the interior of the optical element.

11. The aerosol measurement apparatus according to claim 1, further comprising a signal processing circuit that processes the signal.

12. An aerosol measurement apparatus for measuring an aerosol contained in a scatterer present in an atmosphere, the aerosol measurement apparatus comprising:
    a light source;
    a first optical element that irradiates the scatterer with interfering light produced by causing emitted light emitted from the light source to interfere in an interior of the first optical element, the interfering light having a plurality of peaks spaced at frequency intervals equal to one another;
    a second optical element that emits Mie scattered light by causing scattered light generated in the scatterer to interfere in an interior of the second optical element; and
    a photodetector that receives the Mie scattered light and outputs a signal corresponding to an intensity of light received.

13. The aerosol measurement apparatus according to claim 12, wherein the first optical element and the second optical element are etalons.

14. The aerosol measurement apparatus according to claim 12, wherein the frequency intervals are less than or equal to 3.9 GHz.

15. The aerosol measurement apparatus according to claim 12, wherein
    the emitted light is pulsed light, and
    the photodetector receives the Mie scattered light after having blocked reception of light until a period of time that is longer than a duration of time of the pulsed light has elapsed since the pulsed light was emitted.

16. The aerosol measurement apparatus according to claim 12, wherein the scattered light enters the second optical element obliquely.

17. The aerosol measurement apparatus according to claim 12, wherein the light source is a laser element or a light-emitting diode.

18. The aerosol measurement apparatus according to claim 12, further comprising a condenser that concentrates the scattered light,
    wherein the condenser concentrates the scattered light before the scattered light interferes in the interior of the second optical element.

19. The aerosol measurement apparatus according to claim 12, further comprising a signal processing circuit that processes the signal.

20. An aerosol measurement method for measuring an aerosol contained in a scatterer present in an atmosphere, the aerosol measurement method comprising:
   irradiating the scatterer with interfering light produced by causing light incident from a light source to interfere in an interior of an optical element, the interfering light having a plurality of peaks spaced at frequency intervals equal to one another;
   causing Mie scattered light to be emitted from the optical element by causing scattered light generated in the scatterer to interfere in the interior of the optical element; and
   receiving the Mie scattered light and outputting a signal corresponding to an intensity of light received.

21. An aerosol measurement method for measuring an aerosol contained in a scatterer present in an atmosphere, the aerosol measurement method comprising:
   irradiating the scatterer with interfering light produced by causing light incident from a light source to interfere in an interior of a first optical element, the interfering light having a plurality of peaks spaced at frequency intervals equal to one another;
   causing Mie scattered light to be emitted from a second optical element by causing scattered light generated in the scatterer to interfere in an interior of the second optical element; and
   receiving the Mie scattered light and outputting a signal corresponding to an intensity of light received.

* * * * *